United States Patent Office 2,728,688
Patented Dec. 27, 1955

2,728,688

ANCHORING PROCESS FOR MOISTUREPROOF HEAT-SEALABLE REGENERATED CELLULOSE FILM

Eric Wellisch, East Haven, Conn., assignor to Olin Mathieson Chemical Corporation, a corporation of Virginia No Drawing. Application January 7, 1953,
Serial No. 330,161

3 Claims. (Cl. 117—76)

One of the major commercial problems in the production of moistureproof, heat-sealable, cellophane (regenerated cellulose) is that of anchoring the coating, which provides these properties in the cellophane film, so that the coating will adhere tightly, and when the film is heat-sealed the seals remain intact under high humidity and high temperature conditions. When the heat-seals are tested at 100° F. and 92% relative humidity they evidence a definite degradation and in some cases failure as contrasted with their satisfactory properties at more normal temperatures and lower relative humidities.

Heretofore, the requirements for this type of cellophane have been met with some degree of success by anchoring the moistureproof, heat-sealable, coating to the base film, through the intermediary of water soluble synthetic resins applied to the base film before the final coating. Nevertheless, under the above-mentioned severe test conditions these resin sub-coats leave much to be desired. This problem exists with the usual nitrocellulose lacquer solvent type of moistureproof, heat-sealable coating, and equal if not greater difficulties are encountered when using the recently developed aqueous dispersion type of coating, such as disclosed in Pitzl Patent 2,570,478, issued October 9, 1951. An illustrative example of a copolymer dispersion which may be used in accordance with this invention as the top coat is an aqueous solution of the following:

| | Parts |
|---|---|
| Water | 400 |
| Vinylidene chloride | 368 |
| Methyl acrylate | 24 |
| Itaconic acid | 8 |
| Ammonium persulfate | 0.8 |
| Meta-sodium bisulfite | 0.4 |
| Duponol ME | 8 |

In accordance with the present invention, a marked improvement has been made in the effectiveness of the resin sub-coats for anchoring the copolymer top-coating to the base film. The improvement comprises the use of a special type of anchoring resin and a chemical modification of this particular resin prior to its application to the cellophane; the modification being effected by reacting the resin with a softener compound, such as glycerol or glycol.

We have discovered that the cationic, modified wet strength urea-formaldehyde resin known in the trade as "Beckamine P-630-45" and sold by Reichhold Chemical, Inc., has outstanding, unexpected advantages over other urea formaldehyde resins and particularly when reacted with glycerol or the like as described hereafter.

*Glycerol modification of the resin*

225 grams of Beckamine P-630-45 are mixed with 300 grams of glycerol, and 300 ml. of benzene is added. The mixture is refluxed with stirring, and water is continuously removed by means of a suitable Stark-Dean trap. Since the resin is 45% solids, 125 grams of water corresponds to the theoretical water content and additional amounts of water removed may be ascribed to chemical reaction between resin and softener. After refluxing for 10 hours, 129 grams of water are removed. The mixture is then cooled and benzene is removed under vacuum, yielding 400 grams of yellow viscous solution as the desired product. The resin content of this product is 25%.

An aqueous solution of the above-described modified resin is prepared by dissolving 4 grams of the modified resin in enough water to make 500 grams of solution containing 0.2% of solid resin. This solution is then applied to the uncoated cellophane film to produce dry anchored film ready for top-coating. The cellophane film may be softened previously by treating with glycerol or the like. The aqueous solution of the glycerol-modified resin may be applied to the softened cellophane film during the latter stages of manufacture of the gel film on the casting machine, or it may be applied to the finished dry film after it is taken off the casting machine. In the latter case, the solution may be applied by means of an applicator roll rotating in the solution and in contact with the film, or by other suitable equipment.

This aqueous solution of the glycerol-modified resin may be further improved from the standpoint of the stability of the heat-seals of the cellophane coated therewith, and subsequently top-coated, by incorporating in the aqueous resin solution about 1% to 5% of glycerol. This additional glycerol effectively increases the heat-seal values of the moistureproof heat-seal cellophane quite substantially especially when applied to cellophane of low softener content.

Following the coating of the cellophane film with the above described aqueous solution of chemically modified resin containing if desired the percentage of free glycerol, the film is dried and then top-coated with the aqueous copolymer solution that imparts the moistureproof heat-sealable qualities to the film. This top coat may be applied by an applicator roll or other suitable apparatus. Upon drying of the top coat, the cellophane is ready for use as a moistureproof heat-sealable film, and the heat-seals thereof will withstand the relatively high temperature and moisture conditions above mentioned. Comparative tests between films of this type and the standard films that have the top coat anchored with the usual unmodified resins, show the following outstanding advantage for the improved film of this invention.

| Films | Heat-Seals at 100° F. and 92% R. H. |
|---|---|
| Standard film using unmodified-resin anchor coat | 62 |
| Improved film using glycerol modified resin anchor coat | 110 |
| Improved film using glycerol-modified resin anchor coat applied from an aqueous solution containing about 5% additional glycerol | 175 |

The heat-seals referred to hereinabove are determined in accordance with standardized tests as prescribed in Richard T. Ubben Patent 2,147,180, issued February 14, 1939.

Instead of glycerol, ethylene glycol may be used for modifying the anchor resin. Likewise, the use of other suitable types of resins and other resin-modifying agents to effect the improvements characteristic of this invention, are contemplated in the scope of the appended claims.

I claim:
1. A process for improving the anchoring of an aqueous dispersion copolymer heat-sealable top coat, to a base film of regenerated cellulose, comprising modifying a cationic, wet strength, urea-formaldehyde resin by reacting said resin with glycerol at elevated temperatures and over a period of hours to effect dehydration and softening of the resin, making a water solution of said resin, applying said solution to the regenerated cellulose film, drying the film and then top-coating with said aqueous dispersion copolymer.

2. A process for improving the anchoring of an aqueous dispersion copolymer heat-sealable top-coat, to a base film of regenerated cellulose, comprising modifying a cationic, wet strength urea-formaldehyde resin, by refluxing with glycerol and benzene over a period of hours and at elevated temperatures to effect removal of the water from the resin and softening thereof by the glycerol, followed by removal of the benzene and production of a viscous resin, making a water solution of said resin, incorporating in said solution about 1% to 5% glycerol, anchor coating the regenerated cellulose film with said modified resin and glycerol solution, drying and then top-coating with said aqueous copolymer dispersion.

3. A moistureproof, heat-sealable cellophane film comprising a base sheet of regenerated cellulose, an anchor coating thereon of glycerol-modified, cationic urea formaldehyde resin, and a top coat of a copolymer of vinylidene cholride, methyl acrylate and itaconic acid, said film having a heat-seal value in excess of 100 when tested at a temperature of 100° F. and a relative humidity of 92%.

References Cited in the file of this patent

UNITED STATES PATENTS

| | | |
|---|---|---|
| 2,159,007 | Charch et al. | May 23, 1939 |
| 2,546,575 | Wooding | May 27, 1951 |
| 2,570,478 | Pitzel | Oct. 9, 1951 |
| 2,626,251 | James | Jan. 20, 1953 |

FOREIGN PATENTS

| | | |
|---|---|---|
| 679,054 | Great Britain | Sept. 10, 1952 |